Nov. 22, 1927. 1,650,131
J. I. JOHNSTONE
CASING HEAD
Filed Dec. 7, 1925

INVENTOR,
John I. Johnstone;
BY
ATTORNEY.

Patented Nov. 22, 1927.

1,650,131

UNITED STATES PATENT OFFICE.

JOHN I. JOHNSTONE, OF LYNWOOD, CALIFORNIA, ASSIGNOR OF ONE-HALF TO IRA M. CONKEY, OF MAYWOOD, CALIFORNIA.

CASING HEAD.

Application filed December 7, 1925. Serial No. 73,804.

This invention relates to casing heads and more especially to a cone-pack head; that is, a head having a conical member receiving the tubing and seating on the head body.

An object is to provide utmost simplicity, reduction in number of parts, ease of installation and dismounting, and high efficiency and great durability.

More particularly an object is to provide a packing device employing hydraulic packing material so arranged and sunk that there is no possibility of the packing medium being blown out, which is a serious defect in many types of casing heads.

An object is to provide an instantaneously seating conical packing member. And to provide for the direct connection of the tubing to the packing cone and thereby eliminate ordinary tube coupling at the head.

Additional objects and advantages will be made manifest in the following specification of apparatus embodying the invention herewith illustrated; it being understood that modifications, variations and adaptations may be restorted to within the spirit, scope and principle of the invention.

Figure 1:
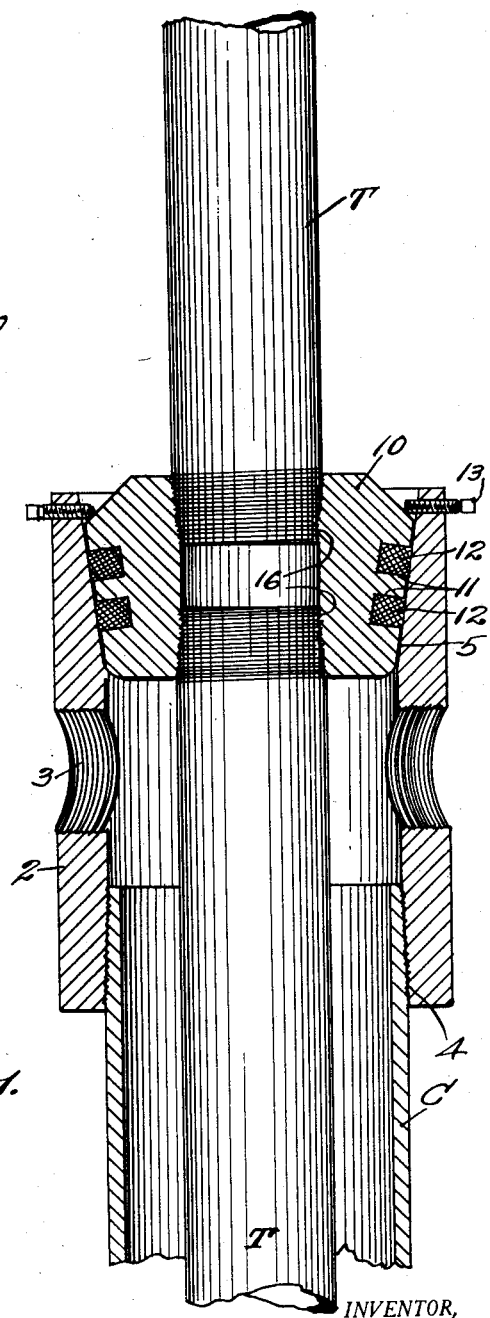
Figure 1 is an axial section of the head adapted for low pressure wells.

The apparatus of Figure 1 comprises a generally tubular body 2 having gas-outlet fitting holes 3, and having its bottom tapped at 4 for well casing C. The upper end of the body 2 has a low angle conical bore 5, smoothly machined or ground.

What is here termed the "cone-pack" comprises a very substantial or stocky plug or closure 10 externally conical to closely seat in the body bore 5.

The head cone or plug is provided with one or more spaced, peripheral grooves 11 whose sides are at right angles to the face of the bore and in these grooves are placed a "square" hydraulic packing medium 12 which has but very small projection beyond the face of the cone or plug 10. The deep countersinking of the packing 12 wholly eliminates any possibility of the gas pressure in the casing tearing or "blowing" out the packing of the head. The upper end of the packer cone 10 may be inwardly tapered so as to receive, when desired, set screws 13 in the body 2.

To the aim of reduction of parts, the cone-pack device 10 is chambered from top to bottom and its upper and lower ends have tubing threads 16 for near ends of pump tubing T—T. This eliminates a coupling in the tubing and obviates any packing bearing upon the tubing and makes it necessary to pack only between the body 2 and cone 10.

In the smaller pump lines and low pressure wells the weight of the tubing will be sufficient to hold down the cone-pack on its seat. But if deemed expedient the screw 13 may be run in over the cone 10.

Figure 2:
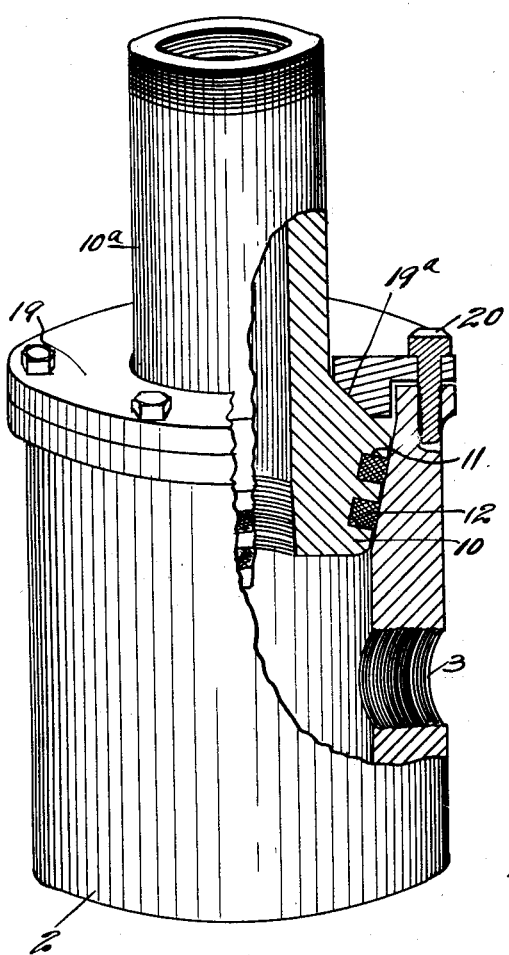
Figure 2 is a perspective, partly in section, of a high pressure adaptation.

To meet the high pressure found in many wells the adaptation shown in Figure 2 is provided. This differs from Fig. 1 in that the cone 10 has an upwardly extending nipple 10$^a$ for attachment of the "Christmas tree" or gas control fittings and instead of the set screws 13 a heavy flange 19 slips down around the nipple and is bolted at 20 to the rim of the body 2. The flange has a conical face 19$^a$ complementary to the top shoulder of the cone-pack and thereby jambs the cone and its packing 12 down solidly in the conical seat or bore 5. The nipple 10$^a$ is internally and externally threaded for fittings and tubing.

It will be seen that there are but two parts, in this complete casing head, to be handled in installing and dismounting, and but one joint zone to be packed off.

The cone-pack casing head eliminates all worry about packing, tubing ring or spider body. The tubing screws into the special cone coupling from above and below, this coupling taking the place of the tubing ring, and when set it securely packs off between the tubing and the casing. The cone taper in the head body is correctly designed for the slips to use when tubing or pulling the well.

In using the cone-pack casing head there is no trouble, inconvenience or delay in putting the well on. When the tubing is landed it instantly becomes securely packed. The packing is never disturbed in the cone and it is always ready to function. After lifting the cone to clear the head body, slips can be used to continue the pulling. The slips, when set, are about flush with the top of the head, making its operation quick and convenient.

The cone-pack casing head compares favorably in cost with any casing head now on the market. With it no replacements are necessary. The cone-pack casing head is economical in first cost and economical in operation. And it eliminates worry and bother.

The method of inserting the packing makes it virtually everlasting. There is no chance of the packing being pulled out of its seat, either by the action of the gas or through contact with another object. When seating the tubing, the travel of the packing along the taper in the head body is so slight that a well can be pulled and tubed hundreds of times without noticeable wear on the packing.

The invention claimed is:

In a casing head device, a tube supporting plug having an elongated, conical outer seating face which is provided with spaced peripheral grooves of rectangular cross-section whose side walls are perpendicular to the conical face and which grooves are adapted to snugly receive given size square packing.

JOHN I. JOHNSTONE.